(12) United States Patent
Specht

(10) Patent No.: US 6,360,981 B1
(45) Date of Patent: Mar. 26, 2002

(54) SEAT BELT RETRACTOR

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/640,242

(22) Filed: Aug. 16, 2000

(30) Foreign Application Priority Data

Aug. 24, 1999 (DE) .......................................... 199 40 034

(51) Int. Cl.$^7$ ............................................... B65H 75/48
(52) U.S. Cl. ................. 242/390.8; 242/379; 242/379.1; 280/805; 280/807
(58) Field of Search .............................. 242/390.8, 379, 242/379.1; 280/805, 807; 297/471, 472, 476, 478

(56) References Cited

FOREIGN PATENT DOCUMENTS

| DE | 4302042 | 7/1994 |
|---|---|---|
| DE | 4314176 | 11/1994 |
| DE | 4332205 | 3/1995 |
| DE | 4429731 | 2/1996 |
| DE | 29605803 | 9/1996 |
| DE | 29608209 | 10/1996 |
| DE | 19621772 | 4/1997 |
| DE | 19733787 | 12/1998 |
| EP | 0858936 | 1/1998 |
| EP | 0893313 | 1/1999 |
| EP | 1022201 | 12/1999 |

*Primary Examiner*—John Q. Nguyen
(74) *Attorney, Agent, or Firm*—Lonnie Drayer

(57) ABSTRACT

A seat belt retractor for a seat belt has a belt reel mounted rotatably about an axis on a frame. An electric motor can be coupled to the belt reel and has an internal planet gear with a planet carrier that forms an output that can be connected to the belt reel. The planet carrier is mounted externally in a cylindrical external bearing that is connected non-rotatably to the frame and internally to a bearing journal that projects axially from the belt reel.

13 Claims, 2 Drawing Sheets

SEAT BELT RETRACTOR

FIELD OF THE INVENTION

The present invention relates to a seat belt retractor.

BACKGROUND OF THE INVENTION

A seat belt retractor according to the invention has an electric motor. Such a seat belt retractor is known from EP 0893313 A2. The present invention provides a force-absorbing bearing with direct rotary connections, for example by coupling the planet carrier to the belt reel, so that forces emanating from the belt reel in a crash do not influence operation of the electric motor, in particular in the region of the gap between the stator and rotor poles.

In a seat belt retractor of this type an electric motor which can be constructed as a flat motor as is known for example from DE 43 32 205 A1 is provided on one side of the frame. In known seat belt retractors torques supplied by the electric motor are caused to act on the winding shaft via a gear mechanism. The known flat motor has a planet gear coaxially arranged in the stator, the planet carrier of which forms the output of the flat motor.

In the present invention the planet carrier is mounted externally in a cylindrical external bearing which is formed on an adapter flange connected non-rotatably to one leg of the frame. Internally the planet carrier is mounted on a bearing journal projecting axially from the belt reel. This bearing journal can optionally be connected integrally to a torsion bar that extends axially into the interior of the belt reel and forms a load limiter. The coupling of the electric motor and the planet carrier to the belt reel, forces which are effective between the electric motor and planet carrier and the belt reel, in particular in the case of a crash, are absorbed by the support formed by the frame leg and the adapter flange. The adapter flange and frame leg are preferably connected with an interlocking fit to form a rigid support. Forces emanating from the belt reel, in particular during the forward displacement of the vehicle occupant after blocking of the belt reel, are absorbed by these supports without affecting the region of the air gap between the stator and rotor poles.

The rotor of the electric motor can be rotatably mounted on a housing secured to the adapter flange, in particular by means of a cylindrical external bearing provided on the housing. In addition a cylindrical internal bearing can be formed on the rotor by the bearing journals projecting from the belt reel.

A coupling operating between the planet carrier and the belt reel can be arranged between an end face of the belt reel and a side face of the adapter flange, in particular in the plane of the lateral frame leg. An interlocking covering of the coupling toward the outside can therefore be achieved by the adapter flange.

The adapter flange can be adapted to respective lateral frame legs of conventional seat belt retractors so that a connection which is non-twisting is achieved between seat belt retractor frame and adapter flange. The adapter flange can also be constructed symmetrically for this purpose. In order to improve the twisting safeguard, flange strips that surround the external contour of the respective lateral frame leg in an interlocking manner can be provided on the adapter flange. As a result of this a position-specific assembly of the adapter flange on the lateral frame leg is furthermore achieved.

DETAILED DESCRIPTION OF THE INVENTION

Figure 1:
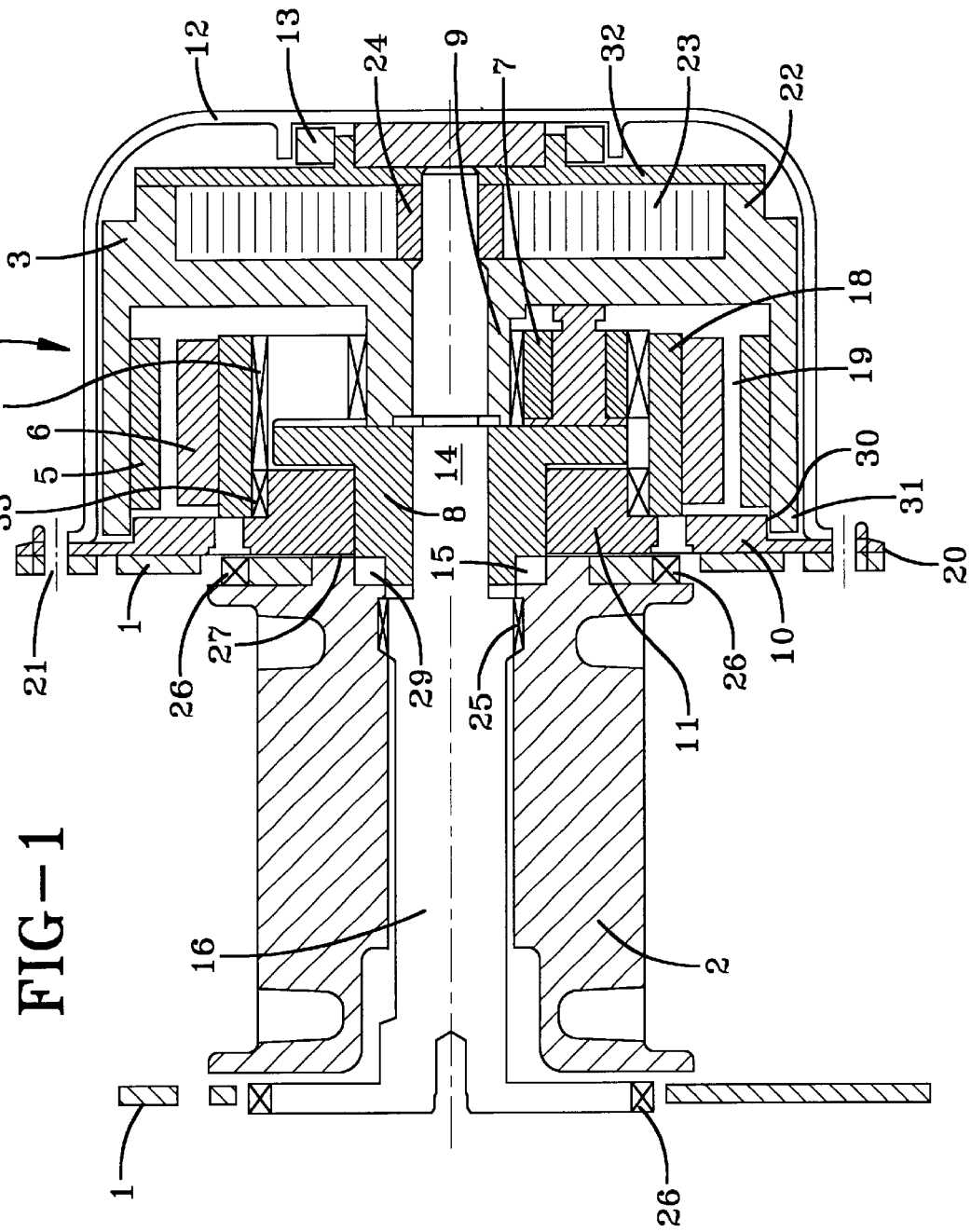
FIG. 1 shows a sectional illustration of an embodiment.

An embodiment of a seat belt retractor according to the invention is shown in FIG. 1 with a belt reel 2 that is rotatably mounted in a seat belt retractor frame of which the two lateral frame legs 1 are schematically illustrated. An electric motor is secured to one of the two frame legs (the right frame leg in the figure) which is constructed for example as a flat motor as is described in DE 43 02 042 A1.

This electric motor 4 has a rotor 3 in a hood-shaped housing 12. On the rotor, which is constructed in the shape of a bell or in the shape of a hood, rotor poles 5, preferably in the form of permanent magnets are provided on the interior of the cylindrical part of the rotor 3. The rotor poles 5 are located on an external radius with respect to the stator poles 6. A gap 19 is formed between the stator poles 6 arranged on an internal radius and the rotor poles.

The rotor 3 is set in motion when the stator poles 6 are supplied with power. The rotation of the rotor 3 is transmitted to a planet gear that is arranged inside the stator poles.

The planet gear acts as a step-down gear has a sun wheel 9 that is connected non-rotatably to the rotor 3. The sun wheel can simultaneously form a bearing bush with which the rotor is additionally mounted on a bearing journal 14 extending axially away from the belt reel 2. In the embodiment illustrated the bearing journal 14 is connected integrally to a torsion bar 16 which extends in an axial direction into the interior of the belt reel. The torsion bar 16 acts as a load limiter as will be described in detail hereafter. A planet wheel 7 that is rotatably mounted on a planet carrier 8 meshes with the sun wheel 9. The planet wheel meshes in addition with a ring gear 17 that is arranged stationarily on the interior of a stator carrier 18 carrying the stator poles 7. The rotation of the rotor 3 is stepped down by the planet gear into a rotation of the planet carrier 8, which in the embodiment illustrated forms the driven side. The planet carrier 8 has a cylindrical part which, internally, is mounted on the bearing journal 14. The cylindrical part of the planet carrier is supported on the outside by a cylindrical external bearing 11. The cylindrical external bearing 11 is composed of one piece with an adapter flange 10. The adapter flange 10 is connected with an interlocking fit and so that it is incapable of twisting to the frame leg 1. The flat sides of the adapter flange and of the frame leg 1 lie flat against one another. External flange strips 20 that surround with interlocking fit the external contour of the frame leg can be provided on the adapter flange 10. The housing 12 of the electric motor 4 is in addition rigidly connected to the adapter flange 10. Common connection points 21 can be provided for this purpose in which moreover the connection between the adapter flange 10 and the frame leg 1 takes place.

The stator carrier 18 is secured, for example by riveted joints, to the adapter flange 10. The stator carrier 18 has an annular configuration and is fixed so as to be incapable of twisting on the support formed by the frame leg 1 and the adapter flange. As a result a secure positioning of the stator carrier 18, which supports on its interior the ring gear 17 and on its exterior the stator poles 6, is ensured. The internal teeth on the stator carrier 18 forming the ring gear are preferably provided along the entire axial extension of the stator carrier. These internal teeth are pressed onto fixed external teeth 33 that are provided integrally on the adapter flange 11. An interlocking fit between the adapter flange and the stator carrier 18 is thus produced in addition to the riveted joint. The external teeth 33 are preferably provided on the exterior of the load-bearing cylindrical external bearing 11 on the adapter flange 10. As a result, a support for the belt reel 2 that is rigid and also absorbs high forces is achieved in conjunction with the planet gear. Forces emanating from the belt reel do not therefore act upon the rotor 3 of the electric motor.

The rotor 3 has on its exterior a spring cartridge 22 in which a motive spring 23 is arranged. The motive spring is supported on its exterior on the inner periphery of the spring cartridge. The motive spring 23 is connected on its interior to the belt reel 2 by a spring core 24. The connection to the belt reel 2 takes place via the bearing journal 14 or the torsion bar 16 which is connected non-rotatably to the belt reel on the interior of the belt reel 2 by one or more connection points 25. A cover 32 is secured to the spring cartridge 22. The spring cartridge is covered on the outside by this cover. The cover is mounted on the housing 12 by a bearing 13. As a result of the non-rotatable connection of the cover 32 to the rotor 3 the bearing 13 forms an external bearing for the rotor. As a result, a cylindrical external rotor bearing 13 is formed. The bearing journal 14, to which the spring core 24 is secured non-rotatably, can additionally be mounted in the housing 12 at its end. Because the end of the bearing journal 14 extends into the cover 26 of the spring cartridge, the journal is also supported on the housing by the external cylindrical rotor bearing 13.

The force of the motive spring 23 can be adjusted by rotating the rotor 3. As a result, a desired level of wear comfort in the applied seat belt can be achieved as a result of the reduction in the restoring force of the motive spring 23, for example. Upon retraction of the belt webbing in the parking position the restoring force of the spring 23 can be increased by corresponding rotor rotation, so that, upon removal, the seat belt webbing is rolled up on the belt reel 2 with increased pull-back force.

The rotor rotation means 3 can in addition serve to tension the seat belt, wherein the motive spring 23 is initially wound to a blocking configuration and the torque produced by the electric motor is transmitted to the belt reel 2 by the bearing journal 14 and the torsion bar 16. This is pretensioning or power tensioning of the seat belt.

In order to carry out the power tensioning an additional belt tensioner can be provided. After tensioning of the seat belt the belt reel 2 is blocked by a blocking device preferably on both end faces. The blocking takes place for example through the intervention of a blocking catch supported on the frame legs 1 in blocking teeth 26 provided on both end faces of the belt reel 2. In the drawing only the right-hand blocking teeth 26 are illustrated. On the left-hand side blocking teeth are connected non-rotatably to the left end of the torsion bar 16 are also provided. In the event of a forward displacement of the vehicle occupant, the belt reel 2 can twist with respect to the left blocked end of the torsion bar 16. The part of the torsion bar between its left end and the connection point 25 provided on the right side of the belt reel 2 twists with consumption of energy so that the applied seat belt acts with load limitation on the body of the forwardly displaced vehicle occupant.

Figure 2:
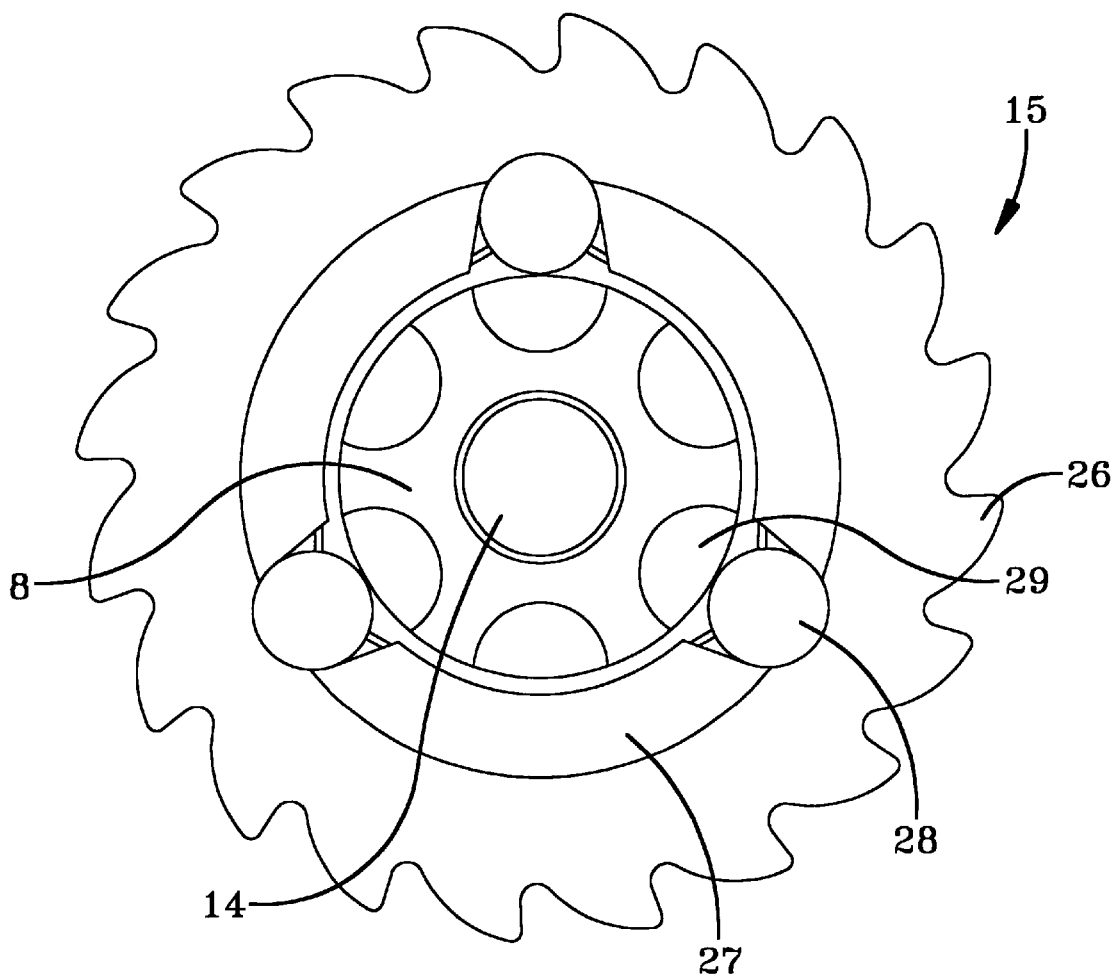
FIG. 2 shows a coupling used in the embodiment.

This force limiting effect can be influenced by the electric motor as a function of the size of the vehicle occupant (5th percentile women to 95th percentile men). To this end the torque of the electric motor 4 is transferred additively or subtractively via a coupling 15 to the belt reel 2. The coupling 15 of which an embodiment is illustrated in FIG. 2 cooperates as follows with the blocking teeth 26 on the right side of the belt reel 2. A further ring 27 that is formed integrally with the belt reel 2 is located inside a ring carrying the blocking teeth 26. Rollers 28 that can be moved in a radial direction are located in the ring. In addition the rollers project into recesses of the ring carrying the blocking teeth. In this way the blocking teeth are connected non-rotatably to the belt reel 2 by the rollers and the ring. The coupling rollers take up this radially external position during normal operation.

Upon blocking of the blocking teeth 26 and a subsequent forward displacement of the vehicle occupant, the ring 27 is rotated relative to the blocking teeth 26 by rotation of the reel, wherein the rollers 28 are pressed radially inwards. As a result rollers engage in recesses 29 which are provided in the planet carrier 8. As a result the planet carrier is connected non-rotatably to the belt reel 2 by the ring. The torque produced by the electric motor 4 can then be added to or subtracted from the load limiting effect of the torsion bar 16. During transmission of the forces that act between the belt reel 2 and the electric motor 4, these forces are effectively taken up by the bearing journal 14 and the adapter flange 10. This forms a load-bearing external bearing 11 around the planet carrier 8 acting as an output of the electric motor. Since the stator carrier 18 is also rigidly connected to the adapter flange 10, it is ensured that the gap 19 between the stator poles 6 and the rotor poles 5 is maintained even with high forces, in particular in a crash.

The rigid construction of rotor 3 and stator 18 is further supported in that the rotor, as explained above, is additionally supported on the housing 12. A stable positioning of the rotor poles 5 and the stator poles 6 while maintaining the air gap 19 is ensured furthermore by the bearing journal 14 which brings about an internal support of the planet gear and the rotor 3.

An additional peripheral stop 30 can be provided on the adapter flange 10 about which an edge region of the rotor 3 is guided in an overlapping arrangement.

The adapter flange 10 in addition forms an additional load-bearing belt reel bearing when belt webbing is drawn out in a crash, in particular with a load limiting effect.

As shown in FIG. 1 the side face of the adapter flange 10 forms a lateral covering of the coupling 15 on the outside. As a result an interlocking covering of the coupling can be achieved.

Although the present invention has been shown and described with respect to an exemplary embodiment thereof, it should be understood by those skilled in the art that various other changes may be made therein without departing from the spirit and scope of the invention.

I claim:

1. A seat belt retractor comprising a belt reel mounted rotatably on a frame, a rotor of an electric motor is coupled to the belt reel and is rotatably mounted coaxially to the belt reel, rotor poles of the electric motor are arranged around stator poles of the electric motor, a planet gear is located inside the stator poles with a planet carrier that forms an output connected to the belt reel, the planet carrier is mounted externally in a cylindrical external bearing that is formed on an adapter flange connected non-rotatably to a frame leg and internally to a bearing journal that projects axially from the belt reel.

2. The seat belt retractor according to claim 1 wherein the stator poles are secured to the adapter flange.

3. The seat belt retractor according to claim 1 wherein the rotor is rotatably mounted on a housing secured to the adapter flange.

4. The seat belt retractor according to claim 3 wherein the rotor bearing provided on the housing forms a cylindrical external bearing.

5. The seat belt retractor according to claim 1 wherein the rotor is mounted on the bearing journal that projects axially from the belt reel and forms a cylindrical internal bearing.

6. The seat belt retractor according to claim 1 wherein the planet carrier is connected non-rotatably to the belt reel by a coupling.

7. The seat belt retractor according to claim 6 wherein the coupling is arranged between an end face of the belt reel and a side face of the adapter flange.

8. The seat belt retractor according to claim 1 wherein the adapter flange surrounds the frame leg external contour with an interlocking fit with flange strips.

9. The seat belt retractor according to claim 1 wherein the bearing journal is connected to a torsion bar that acts as a load limiter.

10. The seat belt retractor according to claim 1 further comprising a peripheral stop, about which an edge region of a hood-shaped rotor is arranged, is provided on the adapter flange.

11. The seat belt retractor according to claim 1 wherein a stator carrier is securely connected on its interior by an interlocking fit to the exterior of the cylindrical external bearing on the adapter flange with a press fit.

12. The seat belt retractor according to claim 11 wherein the stator carrier has internal teeth that engage by a press fit external teeth of the cylindrical external bearing.

13. The seat belt retractor according to claim 12 wherein the internal teeth of the stator carrier form a ring gear of the planet gear.

\* \* \* \* \*